Figure 1:
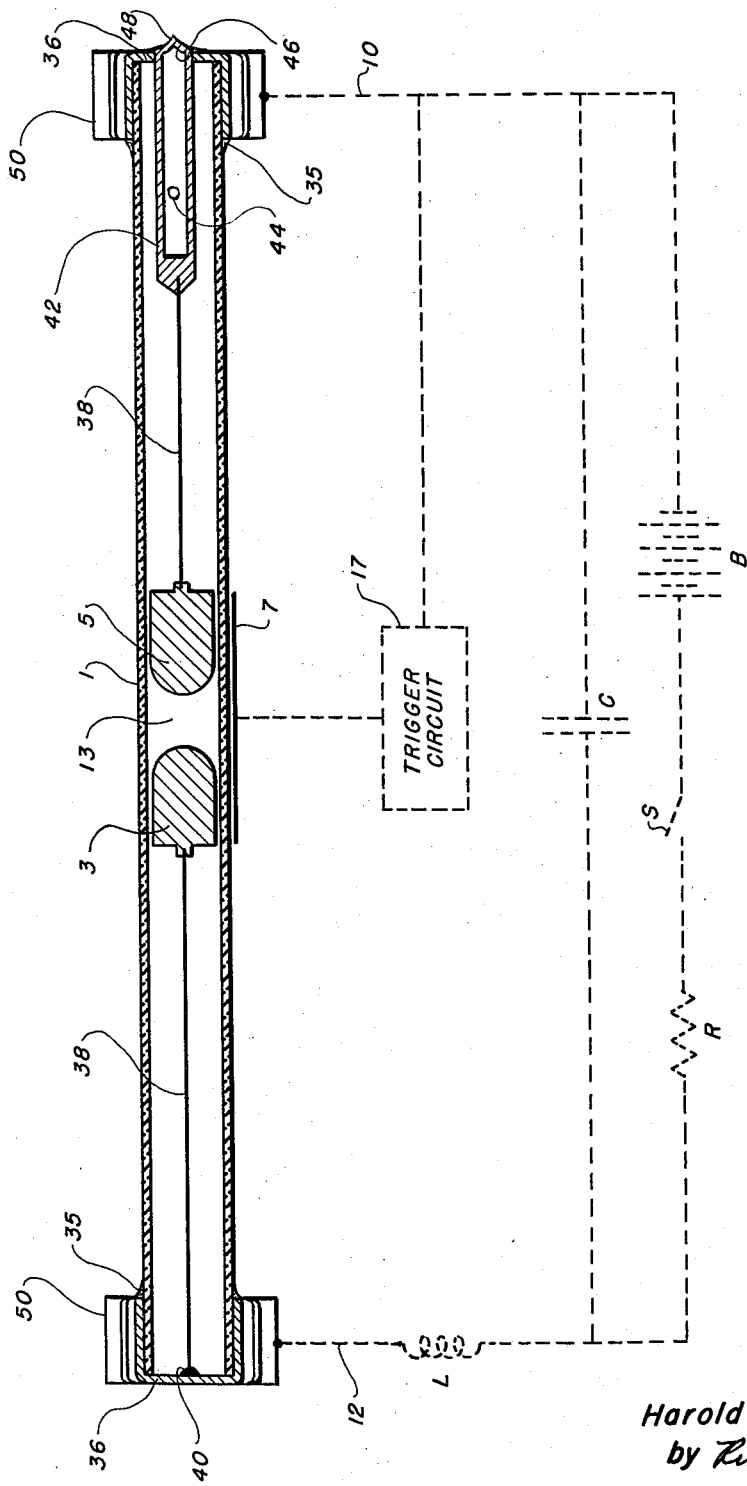

Dec. 29, 1959     H. E. EDGERTON     2,919,369
FLASH TUBE AND APPARATUS

Filed June 1, 1956     3 Sheets-Sheet 1

Inventor
Harold E. Edgerton
by Rines and Rines
Attorneys

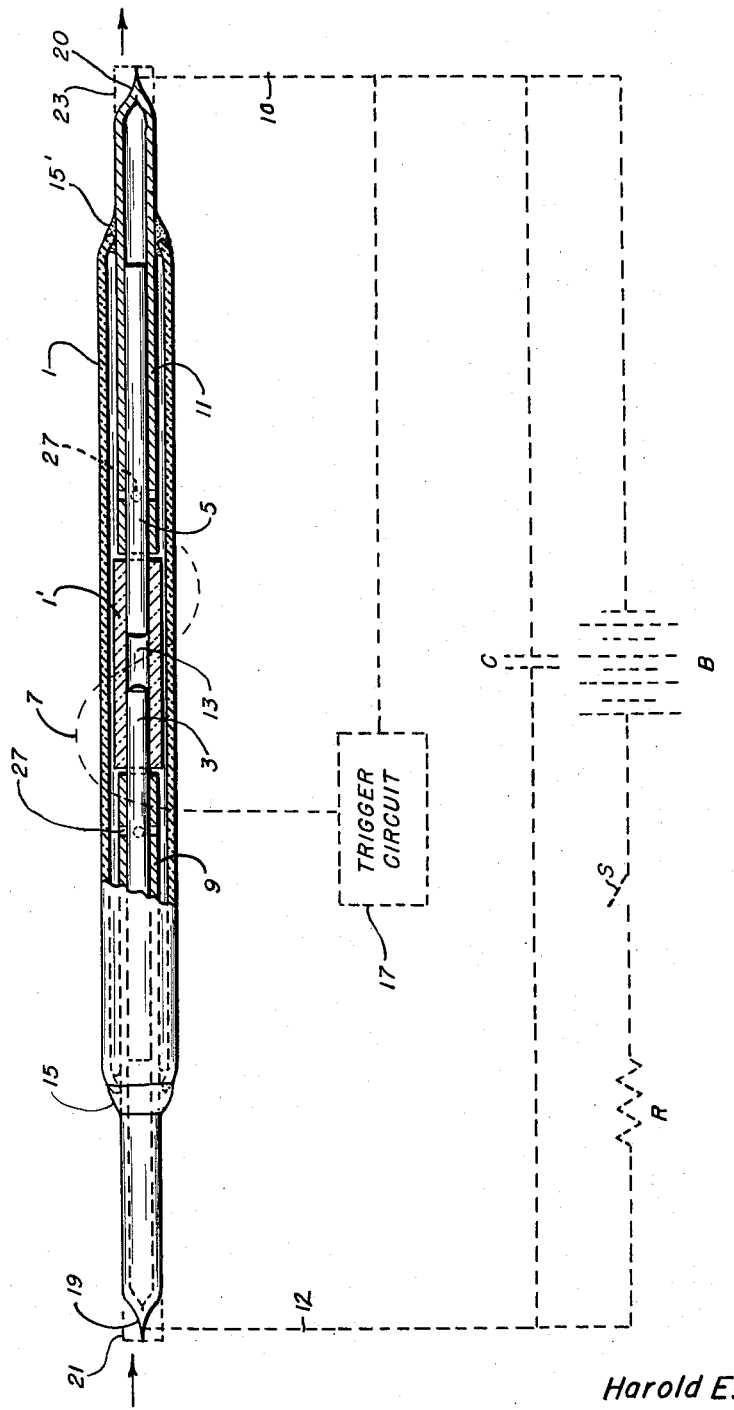

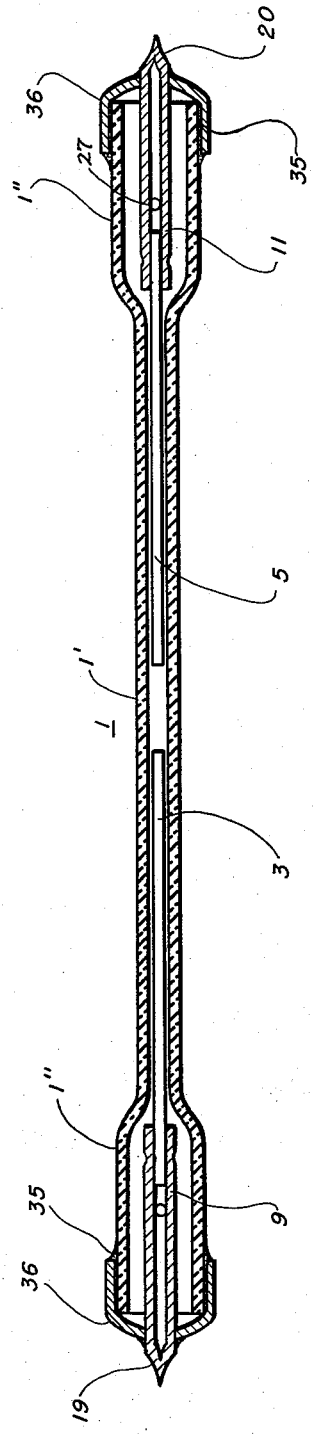

United States Patent Office 2,919,369
Patented Dec. 29, 1959

2,919,369

FLASH TUBE AND APPARATUS

Harold E. Edgerton, Belmont, Mass.

Application June 1, 1956, Serial No. 588,906

11 Claims. (Cl. 313—185)

The present invention relates to flash tubes and, more particularly, to gaseous-discharge flash lamps of the type through which a condenser or other source of energy may discharge to produce a momentary flash of light for such purposes as flash photography, stroboscopy and the like. This application is filed in response to a requirement for restriction in my copending application, Serial No. 341,181, filed March 9, 1953, for Microscope Flash-Photography System and Apparatus, and represents a continuation-in-part thereof.

There are important applications in flash photography and in the stroboscopic field where it is desirable to produce a substantial point or line source of high-intensity flash illumination, or at least a source of high-intensity flash-illumination of very small dimensions. Such a source is of utility for the flash-illumination of a microscope, as described in my said copending application, or for shadow and Schlieren-type flash-photography, as disclosed in another of my copending applications, Serial No. 309,307, filed September 12, 1952, now U.S. Patent No. 2,781,707, for Multiple Light-Flash-Producing System. Other applications for such sources include interferometer optical systems and moving-picture systems as described, for example, in my prior United States Letters Patent No. 2,186,013, issued January 9, 1940. When the electrodes in a flash lamp are reduced in dimension and spaced at close separations, however, various difficulties arise which have heretofore materially reduced the life and effectiveness of such flash tubes. When small-dimensioned electrodes are inserted in an envelope containing a gaseous medium, for example, the pressure of the gaseous discharge forces gas molecules toward the ends of the envelope, thus robbing the flash-producing area or volume between the electrodes of the desired gas concentration. This greatly reduces the light output of the flash tube.

An object of the present invention is to provide a new and improved flash tube that is particularly adapted for construction with very small dimensions and that serves to maintain the volume of gas molecules between the electrodes in the tube substantially constant by effectively preventing the pressure of the discharge from driving appreciable quantities of gas molecules from that volume elsewhere in the tube.

An additional object is to provide a new and improved flash tube.

Still a further object is to provide a new and improved point or line source of flash illumination.

Other and further objects will be explained hereinafter and will be more particularly pointed out in the appended claims.

The invention will now be described in connection with the accompanying drawings, Fig. 1 of which is a longitudinal section illustrating a flash tube constructed in accordance with the present invention; and Figs. 2 and 3 are similar views of modifications.

The flash-tube envelope 1 of Fig. 1 is preferably of a high-temperature transparent material such as vycor-type quartz. The diameter of the envelope, as explained in the said copending application, Serial No. 341,181, is substantially that of the principal electrodes 3 and 5 disposed therein. This serves to confine the discharge, preventing dissipation of the discharged energy throughout the tube, as occurs with present-day tubes of wider diameters. The inner diameter of the tube, for example, may be about one-eighth of an inch, more or less. The electrodes 3 and 5 are axially aligned within the tube and they are placed close together, their diameter or cross-dimension, as before mentioned, being substantially the same as the inner diameter of the envelope 1 at that region. This construction prevents the expansion of substantial quantities of the heated gas within the envelope 1 into the two ends of the tube when the flash-discharge occurs. Since it is essential for the purposes to which the flash tube of the present invention are to be put that a very great light energy per unit area be produced, such expansion and dissipation of energy cannot be tolerated. With the above-described construction, the gas in the flash tube 1 remains in the space 13 between the electrodes 3 and 5 for the greater part of the time of the discharge, thereby insuring the desired high-energy, small-volume discharge.

As explained in the said copending application, the electrodes 3 and 5 may be connected by respective conductors 12 and 10 to a flash capacitor or capacitors C, with the electrode 3 serving as an anode, and the electrode 5 as a cathode. The capacitor means C may be charged, upon closure of a switch S from a source of energy, such as a battery B, through a current-limiting impedance, shown as a resistor R. The voltage stored by the capacitor C, however, is not sufficient in and of itself to produce a discharge in the tube 1 between the electrodes 3 and 5. It is necessary to provide a trigger circuit 17, connected between an external control or trigger electrode 7 and, for example, the cathode 5, to initiate a discharge in the space between the anode 3 and the cathode 5. This then permits the voltage stored by the capacitor C to discharge through the space between the anode 3 and the cathode 5, producing a high-intensity flash of illumination at 13. Other types of trigger and discharge circuits may also be employed, such as those disclosed in my prior United States Letters Patent No. 2,478,901, issued August 16, 1949, and those disclosed in United States Letters Patent No. 2,722,629, issued November 1, 1955, and in Letters Patent Nos. 2,700,120 and 2,700,121, issued January 18, 1955, to Kenneth J. Germeshausen.

For convenience, the ends of the flash-tube envelops 1 may be provided with metal end caps 36, which may be soldered to conductive coatings at 35 upon the envelope 1, as disclosed in copending application, Serial No. 235,480 of Kenneth J. Germeshausen, filed July 6, 1951, now U.S. Patent No. 2,756,361, for Gaseous-Discharge Device and Method of Making the Same. The electrodes 3 and 5 may be supported by narrow wire rods 38. The left-hand rod 38 is shown soldered to the left-hand end cap 36 at 40. The right-hand rod 38 may be supported by a hollow metal cylindrical tube 42 passed through and sealed to the right-hand end cap 36 of the envelope and provided with an intermediate opening 44 within the envelope. The flash tube 1 may be pressurized by connecting the right-hand gas-conducting end passage 46 of the hollow tube 44, external to the envelope 1, to a vacuum system prior to sealing-off the same at 48. The conductors 12 and 10 may be connected to the flash tube by fuse clips 50 that embrace the end caps 36.

It has been found that the pressure of the gas within the envelope should preferably be high, say from about one to about ten atmospheres, in order to achieve the desired results. The tube, moreover, must operate with relatively low voltage from the capacitor C, since if high voltage is used, the tube will rapidly disintegrate due to the excessive instantaneous pressure set up by the rapid discharge through the tube. It has been found that voltages of the order of 400 or 500 volts are satisfactory, and that in some cases it is advisable to use series inductance L in the discharge circuit to prevent too rapid a current rise that may fracture the tube. The series inductance of the connections and the internal inductance of the flash capacitor, moreover, are of great importance in determining the transient current during the flash of such small flash tubes, since the tube resistance is not sufficient critically to damp the current transient, being, for example, of the order of an ohm or less during the discharge. It has been found, moreover, that sintered electrodes may in some cases disintegrate when so utilized, and that the electrodes 3 and 5 should therefore, in those cases, preferably be of pure tungsten and the like. The electrodes may be rounded at the ends, as illustrated.

During use, some material from the electrodes will sputter or erode upon the walls of the quartz-tube envelope 1. It has been determined, however, that, with the type of tube construction and operation previously described, such erosion of the electrode material fortunately does not substantially occur upon the walls of the tube envelope in the space 13 between the electrodes 3 and 5, but, rather, principally upon those portions of the envelope walls adjacent the longitudinal sides of the electrodes 3 and 5. This is a very desirable result since the sputtered material is light-constricting. Its deposit on the portions of the walls of the tube on either side of the region 13 between the electrodes 3 and 5, however, causes no difficulty in the use of the tube to produce the desired area of high illumination.

As an illustration, successful color photographs have been obtained with the apparatus above-described to flash-illuminate the specimen region of a microscope having a magnitude of about 700. A flash-producing circuit including a capacitor C of 180 microfarads was used, charged to 450 volts for providing electrical energy between the principal electrodes 3 and 5. The flash tube 1 contained xenon gas. The cross-dimension and separation of the electrodes 3 and 5 were substantially the same, namely of the order of about one-eighth of an inch. Flash tubes may, however, be operated with electrode separation and electrode thickness somewhat less than and somewhat greater than about one-eighth of an inch, though the smaller the dimension, the lower the voltage that can be utilized, and the larger the dimension, the less light intensity per unit area. With the separation between electrodes 3 and 5 substantially the same as the diameter or cross-dimension of the electrode, a substantially square cross-sectional area 13 of light is produced. As above indicated, this area is preferably about one-eighth of an inch on the side and corresponds substantially to the area of conventional microscopic substage image regions.

A modified and somewhat simpler and more efficient construction is illustrated in Fig. 2. A pair of preferably tungsten electrodes of cylindrical form are shown at 3 and 5 inserted within conducting tubes 9 and 11, as of copper tubing, and of inner diameter substantially the same as the outer diameter of the tungsten electrodes 3 and 5. The electrodes 3 and 5 thus fit snugly within the supporting tubular members 9 and 11 with the right-hand terminal portion of the electrode 3 and the left-hand terminal portion of the electrode 5 extending from the right-hand end of the tube 9 and the left-hand end of the tube 11, respectively, toward one another to define therebetween a discharge space or volume 13. A fused quartz cylinder envelope portion 1' may be tightly fitted over the axially aligned right-hand terminal portion of the electrode 3 and the lef-hand terminal portion of the electrode 5 to maintain the electrodes in fixed axial alignment and to enclose the discharge space 13. The quartz cylinder 1' can withstand the tremendous heat developed during gaseous discharges in the space 13 between the electrodes 3 and 5.

Surrounding the assembly, 1', 3, 5, 9, 11, may be disposed the main glass or quartz envelope 1 which may be secured, as by solder-seal connections, wax or cement and the like, to the left-hand and right-hand portions of the respective tubes 9 and 11, as at 15 and 15'. The cylinder 1' thus serves as a reduced-dimension or capillary region of the envelope 1. The left-hand end of the tube 9, shown dotted at 21, and the right-hand end of the tube 11, shown dotted at 23, may be connected into a gas-infusing system, schematically represented by the arrows, which may pump the desired gas into the opening 21 in the tube 9 and out the end 23 of the tube 11. Under the high pressure of the gas-infusing system, the gas will leak through the mechanically tight fit between the electrode 3 and the tube 9 and between the electrode 5 and the tube 11 to force gas through the space 13. A quantity of gas is thus permitted to pass through the flash tube. The electrical flashing circuit, which may be the same as described in connection with the embodiment of Fig. 1, is then caused to produce a discharge between the electrodes 3 and 5. Continued introduction of the gas accompanied by further discharges have been found to result in the elimination of undesirable impurities and the establishment of the desired gas concentration at the desired pressure in the discharge space 13. Openings 27 are provided in the tubular members 9 and 11 to assist in this process of producing the desired gas pressure and the desired purity of gas in the discharge region or space 13.

With the proper gaseous medium in the space 13, the left-hand end of the tube 9 and the right-hand end of the tube 11, external to the envelope, may be pinched off and sealed, thereby providing a flash tube that is ready for use. The left-hand and right-hand extensions of the respective tubes 9 and 11 that have thus been closed off may be clamped into fuse-type clip holders of the type shown at 50 in Fig. 1, or they may be otherwise adapted for electrical connection to the flash capacitor or capacitors C. The trigger electrode 7 is shown in the form of an external loop instead of the straight-electrode configuration of Fig. 1.

Through the above construction, there is presented an extremely high impedance to the flow of gas molecules out of the space 13 so that the gas in the discharge space 13 remains at substantially the same concentration despite the large pressures built up between the electrodes 3 and 5 during discharges therebetween which tend to drive the gas molecules from the space 13 into the left- and right-hand ends of the tube 1. High-intensity flashes are thus produced over prolonged periods of time without substantial dissipation of intensity or accuracy of flashing which would normally result if appreciable quantities of gas molecules were driven from the flash region 13 to other parts of the tube.

If desired, instead of providing a separate reduced envelope region 1' for the envelope 1, as in the case of the embodiment of Fig. 2, the tungsten or similar electrodes 3 and 5 may be directly tightly fitted or secured within a capillary or reduced intermediate region 1' continuous with the end regions 1" of the quartz envelope 1. The ends 1" of the envelope 1 are enlarged to receive the tubular members 9 and 11. End caps 36 may be soldered to metal coatings 35 upon the end regions 1" of the envelope 1, as discussed in connection with the embodiment of Fig. 1. This capillary construction assists in restraining the arc to the desired predetermined volume without positional flicker or fluctuation in the arc discharge.

In all cases, however, the flash tubes of the present invention provide high-intensity flashes of small light-source area that are particularly adapted for fast flash times. A xenon flash tube of the type illustrated in Fig.

3, as a further example, having a cylindrical flash volume 13 about 1.2 millimeters in diameter and 6 millimeters in length, has been flashed successfully at up to 6000 flashes per second with flash durations ranging from 0.3 to 3 microseconds. A peak light intensity of 10 million candlepower per square centimeter has been achieved. In xenon tubes of this character, moreover, flash-tube voltages ranging from about 400 volts to 3 kilovolts have been successfully employed with capacitors C ranging from 0.01 to 1 microfarad. Gas pressures of the order of six centimeters of mercury produced maximum peak light in some cases. An increase in peak light was obtained in other instances by increasing the pressure from one to three atmospheres. While in the tube of Fig. 1, the cross-dimension of the electrodes 3 and 5 is substantially the same as the length of the space 13 between the electrodes, which is useful for the microscope-illumination purposes before-mentioned, the small-line light sources of Figs. 2 and 3 may have a space length 13 several times the cross-dimension of the electrodes, ranging up to about twelve times. The before-mentioned 6 millimeter spacing, for example, was five times the 1.2 millimeter electrode diameter.

While argon gas, as another illustration, does not produce the desirable spectral qualities of xenon, it, too, has been successfully employed in the flash tubes of the present invention. Further modifications will occur to those skilled in the art and all such are considered to fall within the spirit and scope of the invention as defined in the appended claims.

What is claimed is:

1. A flash tube having a light-transparent envelope containing a pair of spaced solid electrodes of cross-dimension over a substantial length thereof substantially the same as the inner cross-dimension of the envelope in the region of and in the space between the electrodes, the said space being filled with gas at high pressure and the tube being provided at its ends beyond the electrodes with expansion chambers.

2. A flash tube having a light-transparent envelope containing a pair of spaced solid electrodes substantially touching the inner walls of the envelope over a substantial length thereof, the space between the electrodes being filled with gas at high pressure and the tube being provided at regions beyond the electrodes with expansion chambers.

3. A flash tube having a light-transparent envelope containing a pair of spaced electrodes extending substantially completely across the cross-section of the envelope, the space between the electrodes being filled with gas at high pressure, and the said space being of length ranging from substantially the electrode cross-dimension to several times the same.

4. A flash tube having a light-transparent envelope containing a pair of spaced electrodes of cross-dimension substantially equal to the inner cross-dimension of the envelope in the region of and in the space between the electrodes, the said space being filled with gas at high pressure, conductive tubular support means disposed partially within and partially external to the envelope for supporting at least one of the electrodes at a point remote from the said space, the support means being provided with aperture means within the envelope and a gas-conducting passage external to the envelope, and a gas-tight seal disposed between the envelope and the support means.

5. A flash tube having a light-transparent envelope containing a pair of axially aligned spaced substantially cylindrical electrodes of diameter substantially equal to the diameter of the envelope in the region of and in the space between the electrodes, the said space being filled with gas at high pressure, a pair of conductive substantially cylindrical tubular supports disposed partially within and partially external to the envelope and of diameter slightly larger than the electrode diameter for receiving the ends of the pair of electrodes remote from the said space, the supports being provided with aperture means within the envelope and gas-conducting passages external to the envelope, and gas-tight seals disposed between the envelope and the supports.

6. A flash tube having a light-transparent envelope provided with a portion of reduced cross-dimension containing within the said portion a pair of spaced electrodes of cross-dimension substantially the same as the cross-dimension of the said portion, the space between the electrodes in the said portion being filled with gas at high pressure.

7. A flash tube having a light-transparent envelope provided with a portion of reduced cross-dimension containing within the said portion a pair of spaced electrodes of cross-dimension substantially the same as the cross-dimension of the said portion, the space between the electrodes in the said portion being filled with gas at high pressure, and tubular supporting means for the said electrodes external to the said portion extending through the ends of the envelope and provided with aperture means within the envelope.

8. A flash tube having a light-transparent substantially cylindrical envelope provided with an intermediate substantially cylindrical portion of reduced diameter containing within the said portion a pair of spaced substantially cylindrical electrodes of diameter substantially the same as the diameter of the said reduced portion, the space between the electrodes in the said portion being filled with gas at high pressure.

9. A flash tube having a light-transparent substantially cylindrical envelope provided with an intermediate substantially cylindrical quartz portion of reduced diameter containing within the said portion a pair of spaced substantially cylindrical electrodes of diameter substantially the same as the diameter of the said reduced portion, the space between the electrodes in the said portion being filled with a gas selected from the group consisting of xenon and argon at a pressure of from substantially one to substantially ten atmospheres.

10. A flash tube having a quartz light-transparent envelope in which is disposed a pair of spaced principal pure tungsten electrodes between which an electrical discharge may pass to produce a flash of light, the cross-dimension of the electrodes being substantially equal to or less than about one-eighth of an inch and just slightly smaller than the cross-dimension of the envelope and the distance between the principal electrodes corresponding to the cross-dimension of the electrodes, the envelope being filled with gas maintained at from about 1 to about 10 atmospheres of pressure, and a trigger electrode disposed near a portion only of the envelope adjacent the space between the principal electrodes.

11. A spark discharge device including in combination, a pair of spark discharge electrodes adapted to be connected in a high voltage circuit, and a transparent member having an internal capillary passage in which said electrodes are positioned, said capillary passage being vented to the exterior of said transparent member to provide an escape path for erosion products.

References Cited in the file of this patent

UNITED STATES PATENTS

| | | |
|---|---|---|
| 2,130,077 | Dorgelo | Sept. 13, 1938 |
| 2,154,542 | Swanson | Apr. 18, 1939 |
| 2,177,702 | Francis | Oct. 31, 1939 |